United States Patent
Guan (10) Patent No.: US 10,824,924 B2
(45) Date of Patent: Nov. 3, 2020

(54) ELECTRONIC LABEL, ELECTRONIC LABEL SYSTEM AND DATA PROCESSING METHOD

(71) Applicant: BOE TECHNOLOGY GROUP CO., LTD., Beijing (CN)

(72) Inventor: Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 16/175,297

(22) Filed: Oct. 30, 2018

(65) Prior Publication Data

US 2019/0251408 A1   Aug. 15, 2019

(30) Foreign Application Priority Data

Feb. 11, 2018   (CN) .......................... 2018 1 0142250

(51) Int. Cl.
| | |
|---|---|
| *G06K 9/00* | (2006.01) |
| *G06K 17/00* | (2006.01) |
| *G01J 5/34* | (2006.01) |
| *G06T 7/73* | (2017.01) |
| *G01J 5/00* | (2006.01) |

(Continued)

(52) U.S. Cl.
CPC ........ *G06K 17/0022* (2013.01); *G01J 5/0025* (2013.01); *G01J 5/34* (2013.01); *G06K 9/00335* (2013.01); *G06K 9/00597* (2013.01); *G06K 9/00778* (2013.01); *G06T 7/73* (2017.01); *H04N 7/188* (2013.01); *H04W 4/80* (2018.02)

(58) Field of Classification Search
CPC ...... G06K 19/0707; H02J 50/00; H02J 50/20; H02J 50/90; H02J 7/025

USPC ..... 382/103; 705/14.25, 14.38, 16, 20, 14.1, 705/14.4, 26.1, 15, 27.1; 235/375, 383, 235/380; 340/10.1, 522, 531; 345/214, 345/1.2

See application file for complete search history.

(56) References Cited

U.S. PATENT DOCUMENTS

| | | | | |
|---|---|---|---|---|
| 7,119,804 B2 * | 10/2006 | Sweeney | .............. | G08B 13/246 |
| | | | | 345/214 |
| 10,357,118 B2 * | 7/2019 | Swafford | .............. | A47F 5/0068 |
| 2016/0342939 A1 | 11/2016 | Jones et al. | | |

(Continued)

FOREIGN PATENT DOCUMENTS

| | | |
|---|---|---|
| CN | 103885599 | 6/2014 |
| CN | 104885111 | 9/2015 |

(Continued)

OTHER PUBLICATIONS

1st Office Action dated Aug. 4, 2020 for Chinese Patent Application No. 201810142250.7.

*Primary Examiner* — Charlotte M Baker (74) *Attorney, Agent, or Firm* — Foley & Lardner LLP (57) ABSTRACT

The present disclosure relates to an electronic label, an electronic label system and a data processing method. The electronic label includes an electronic label body and a proximity sensing module. The proximity sensing module is disposed in the electronic label body and configured to detect whether there is a human body within a certain range from the electronic label. In response, the proximity sensing module is configured to generate a corresponding detection signal when a human body is detected. The detection signal is used to obtain a duration of stay of the human body before the electronic label.

20 Claims, 4 Drawing Sheets

(51) Int. Cl.
 *H04N 7/18* (2006.01)
 *H04W 4/80* (2018.01)

(56) References Cited

U.S. PATENT DOCUMENTS

2017/0147966 A1* 5/2017 Aversa ................. G06Q 10/087
2018/0365741 A1* 12/2018 Ryu ................... G06Q 30/0281

FOREIGN PATENT DOCUMENTS

| CN | 105164720 | 12/2015 |
| CN | 105518734 | 4/2016 |
| CN | 105678591 | 6/2016 |
| CN | 106371465 | 2/2017 |

* cited by examiner

ELECTRONIC LABEL, ELECTRONIC LABEL SYSTEM AND DATA PROCESSING METHOD

CROSS-REFERENCE TO RELATED APPLICATIONS

This application claims priority to Chinese Patent Application 201810142250.7, filed Feb. 11, 2018, the entire contents of which are incorporated herein by reference.

TECHNICAL FIELD

The present disclosure relates to smart retail technical field, and particularly to an electronic label, an electronic label system and a data processing method.

BACKGROUND

For traditional paper price tags or labels, it is difficult to frequently modify information, and such modification involves great human labor, and may result in large errors. Also, the traditional paper price tags or labels are easy to lose, have low efficiency, and may result in increased operation costs. As compared to these disadvantages of traditional paper price tags or labels, electronic tags or labels have features such as fast information modification, low error rate, promotion of sales, long service life and so on. Due these advantages, electronic tags have drawn attentions of retailers, and have been widely applied in more and more supermarkets. Currently, the electronic tags or labels are mainly used for displaying information.

SUMMARY

Arrangements of the present disclosure provide an electronic label, an electronic label system and a data processing method.

According to an aspect, there is provided an electronic label. The electronic label includes an electronic label body. The electronic label includes a proximity sensing module disposed in the electronic label body. The proximity sensing module is configured to detect a human body within a certain range from the electronic label and generate a corresponding detection signal when a human body is detected. The detection signal is used to obtain a duration of stay of the human body before the electronic label.

In an exemplary arrangement of the present disclosure, the proximity sensing module includes a pyroelectric infrared sensing unit.

In an exemplary arrangement of the present disclosure, the electronic label further includes: a communication module configured to send the detection signal and corresponding unique identification of the electronic label.

In an exemplary arrangement of the present disclosure, the proximity sensing module is disposed at an intermediate position of the electronic label body and has a preset sensing range.

According to another aspect of the present disclosure, there is provided an electronic label system. The electronic label system includes an electronic label that includes an electronic label body and a proximity sensing module. The proximity sensing module is configured to a human body within a certain range from the electronic label and generate a corresponding detection signal when a human body is detected. The electronic label system includes a server end configured to receive the detection signal. According to the detection signal, the server end is configured to obtain a duration of stay of the human body before the electronic label.

In an exemplary arrangement of the present disclosure, the electronic label system further includes one or more image collection devices configured to collect video images within a predetermined range of the electronic label.

In an exemplary arrangement of the present disclosure, the server end is further configured to call one of the one or more image collection devices corresponding to the electronic label according to the detection signal, and acquire corresponding video images.

In an exemplary arrangement of the present disclosure, the electronic label further includes: a first image recognition device configured to recognize the video image to obtain a number of customers within a sensing range of the proximity sensing module.

In an exemplary arrangement of the present disclosure, the server end is further configured to determine, according to the detection signal, whether there are a plurality of electronic labels that sense the human body at a same time period, and whether the plurality of electronic labels are adjacent to each other, and determine whether to call ones of the one or more image collection devices corresponding to the plurality of electronic labels according to a determination result.

In an exemplary arrangement of the present disclosure, the electronic label system further includes: a second image recognition device configured to: if there are a plurality of electronic labels that sense the human body at the same time period and the plurality of electronic labels are adjacent to each other, pick up video images from the ones of the one or more image collection devices within the time period, recognize the video images within the time period, and determine a product to which attention is currently paid.

According to another aspect of the present disclosure, there is provided a data processing method includes receiving a detection signal. The detection signal is generated by detecting a human body within a certain range from the electronic label. The method includes obtaining a duration of stay of the human body before the electronic label according to the detection signal. The method includes obtaining a degree of attention for a product corresponding to the electronic label according to the duration of stay.

In an exemplary arrangement of the present disclosure, the method further includes obtaining video images corresponding to the electronic label according to the detection signal.

In an exemplary arrangement of the present disclosure, the method further includes recognizing the video images to obtain a number of customers within a certain range of the electronic label.

In an exemplary arrangement of the present disclosure, the method further includes determining, according to the detection signal, whether there are a plurality of electronic labels that sense the human body at a same time period and whether the plurality of electronic labels are adjacent to each other. If there are a plurality of electronic labels that sense the human body at a same time period and the plurality of electronic labels are adjacent to each other, the method further includes obtaining video images corresponding to the plurality of electronic labels within the time period. The method further includes recognizing the video images within the time period, and determining a product to which attention is currently paid.

In an exemplary arrangement of the present disclosure, recognizing the video images within the time period, and determining a product to which attention is currently paid includes extracting an action characteristic of the human body, and identifying the product to which attention is currently paid based on the action characteristic.

In an exemplary arrangement of the present disclosure, recognizing the video images within the time period, and determining a product to which attention is currently paid includes identifying an angle between a human eye of the human body and a product in the video images, identifying an angle of depression or elevation of the human body in the video images, and determining whether the product is the product on which attention is currently paid based on the angle between the human eye and the product and the angle of depression or elevation of the human body.

In an exemplary arrangement of the present disclosure, determining whether the product is the product on which attention is currently paid based on the angle between the human eye and the product and/or the angle of depression or elevation of the human body includes if the human eye and a product are parallel or the angle of depression or elevation and a deflection angle of the human body are within a first predetermined angle range, determining that the product on which attention is currently paid is a product on a shelf of a rack which is right in front the human body, if the head of the human body is elevated at an angle greater than the first predetermined angle, determining that the product on which attention is currently paid is a product placed one shelf higher than the shelf right in front of the human body, if the head of the human body is elevated at an angle greater than a second predetermined angle, determining that the product on which attention is currently paid is a product placed two shelves higher than the shelf right in front of the human body, if the head of the human body is bowed at an angle smaller than a third predetermined angle, determining that the product on which attention is currently paid is a product placed one shelf lower than the shelf right in front of the human body, if the head of the human body is bowed at an angle smaller than a fourth predetermined angle, determining that the product on which attention is currently paid is a product placed two shelves lower than the shelf right in front of the human body.

In an exemplary arrangement of the present disclosure, recognizing the video images within the time period, and determining a product to which attention is currently paid includes identifying a deflection angle of the human body in the video images, determining a product to which attention is currently paid based on the deflection angle of the human body.

In an exemplary arrangement of the present disclosure, determining a product to which attention is currently paid based on the deflection angle of the human body includes if the deflection angle to the left or the right is within a fifth predetermined angle range, determining that the product on which attention is currently paid is a product on a shelf of a rack which is right in front the human body, if the deflection angle to the left is greater than the fifth predetermined angle range, determining that the product on which attention is currently paid is a product on a first left column of the shelf, if the deflection angle to the left is greater than a sixth predetermined angle, determining that the product on which attention is currently paid is a product on a second left column of the shelf, if the deflection angle to the right is greater than a seventh predetermined angle, determining that the product on which attention is currently paid is a product on a first right column of the shelf, if the deflection angle to the left is greater than an eighth predetermined angle, determining that the product on which attention is currently paid is a product on a second right column of the shelf.

In an exemplary arrangement of the present disclosure, the method further includes obtaining sales of the products; and classifying the products according to the sales of the products and the degree of attention to the products.

The above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary arrangements of the present disclosure. The drawings along with the specification explain the principles of the present disclosure. It is apparent that the drawings in the following description show only some of the arrangements of the present disclosure, and other drawings may be obtained by those skilled in the art without departing from the drawings described herein.

DETAILED DESCRIPTION

Example arrangements will now be described more fully with reference to the accompanying drawings. The example arrangements can be embodied in a variety of forms, and should not be construed as being limited to the examples set forth herein; the described features, structures, or characteristics may be combined in any suitable manner in one or more arrangements. In the following description, numerous specific details are set forth. However, one skilled in the art will appreciate that one or more of the specific details may be omitted or other methods, components, devices, steps, etc. may be employed.

It is pointed out that in the drawings, the dimensions of layers and regions may be exaggerated for clarity of illustration. It is also understood that when an element or layer is referred to as "on" another element or layer, it may be directly on the other element or an intermediate layer may be present. In addition, it can be understood that when an element or layer is referred to as being "under" another element or layer, it may be directly under the other element or more than one intermediate layers or elements may be present. In addition, it can also be understood that when a layer or element is referred to as being "between" two layers FIG. 1 shows a schematic diagram of an electronic label according to an exemplary arrangement of the present disclosure.

Figure 1:
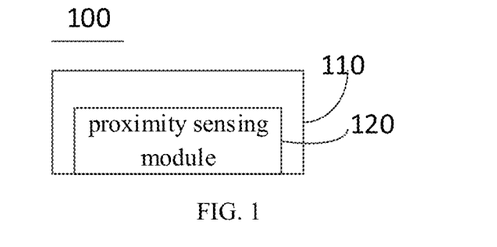
FIG. 1 shows a schematic diagram of an electronic label according to an exemplary arrangement of the present disclosure.

As shown in FIG. 1, the electronic label 100 provided in this arrangement may include an electronic label body 110 and a proximity sensing module 120.

The proximity sensing module 120 can be disposed in the electronic label body 110 and is configured to detect a human body within a certain range from the electronic label 100 and generate a corresponding detection signal when a human body is detected. The detection signal is used to obtain a duration of stay of the human body before the electronic label 100.

In an exemplary arrangement, the proximity sensing module 120 may include a pyroelectric infrared sensing unit (or a pyroelectric infrared human body sensor). However, the present disclosure is not limited thereto, and any technique capable of sensing proximity of a human body can be applied to the present disclosure.

For example, when a customer walks into a supermarket and approaches a certain shelf, the pyroelectric infrared human body sensor placed on the electronic label that is disposed on the shelf senses the presence of the human body, and the output signal of the pyroelectric infrared human body sensor becomes low. A MCU (Microcontroller Unit) of the electronic label can detects the low level, and internal programs in the MCU start automatic timing.

When the customer leaves, the output signal of the pyroelectric infrared human body sensor becomes a high level signal, and the MCU of the electronic label detects a rising edge, and the timing ends. At this time, the electronic label will report information such as the start time and the end time of the infrared sensing, and ID (identification, the unique identity) of the electronic label to a server end, such as a server or a cloud end, through a gateway. After processing the received upload information, the server end can obtain the duration of the stay of the customer before the electronic label.

It should be noted that the high and low levels here are only used for illustration. For example, as an alternative, when the proximity of the customer is sensed, the output signal of the pyroelectric infrared human body sensor becomes high, and when the customer is detected to leave, the output signal of the pyroelectric infrared human body sensor becomes low, as long as the output signal can distinguish the approaching and leaving of the human body, and the disclosure does not impose specific limitations on this.

In an exemplary arrangement, the electronic label 100 may further include: a communication module configured to send the detection signal and corresponding identification of the electronic label. The electronic label has a wireless communication function: NFC (Near Field Communication) or Bluetooth communication or WIFI (Wireless-Fidelity) communication.

In an exemplary arrangement, the proximity sensing module 120 may be disposed at an intermediate position of the electronic label body 110 and has a preset sensing range. For example, the proximity sensing module 120 is disposed at an intermediate position of the lower side of the electronic label body 110, but the disclosure is not limited thereto.

Specifically, the proximity sensing module 120 can include a pyroelectric infrared human body sensor. The pyroelectric infrared human body sensor can be located at any position of the electronic label, and can detect a human body within a certain distance from the electronic label, for example, 0.1 meter. In FIG. 1, the pyroelectric infrared human body sensor is disposed at a center position of the electronic label 100, for exmaple.

The electronic label can replace the price tags or labels currently used in malls or supermarkets, and has a built-in RFID (Radio Frequency Identification) near field communication electronic chip in which information related to products can be written, and the information may be displayed. The information related to a product may include the manufacturer, production date, and product barcode, components and the price of the product. Also, the electronic label can exchange product information with the server. The other components of the electronic label can refer to the existing electronic label and will not be described in detail herein.

The electronic label provided by the arrangement of the present disclosure can automatically record the residence time (in another word, duration of stay) of people in front of a product in a supermarket or mall, by adding a proximity sensing module such as a pyroelectric infrared human body sensor based on the previous electronic label, so that it is possible to analyze the degree of attention on products by using the residence time, and provide the supermarket and company with the support of the big data regarding degree of attention on products, thus helping manufacturers to improve the products and optimize layout of the supermarket or mall.

Figure 2:
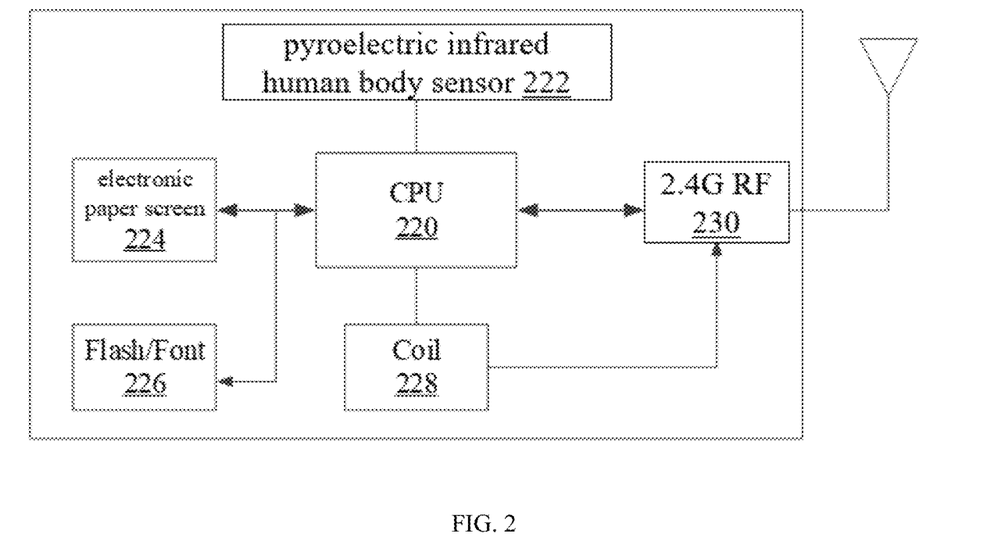
FIG. 2 shows a functional block diagram of an electronic label according to an exemplary arrangement of the present disclosure.

FIG. 2 shows a functional block diagram of an electronic label according to an exemplary arrangement of the present disclosure.

As shown in FIG. 2, the electronic label provided in this arrangement includes a CPU (Central Processing Unit) 220, a pyroelectric infrared human body sensor 222, and an electronic paper screen 224 (FIG. 2 is only an example and the disclosure is not limited thereto, any kind of screen is possible, for example, a liquid crystal display), a FLASH module for storing a flash/font 226, a coil 228, and a 2.4G RF (Radio Frequency) 230. The CPU is coupled to the pyroelectric infrared human body sensor, the electronic paper screen, the flash/font, the coil and the 2.4G RF connection, so that these components can communicate with each other. The electronic label can transmit the signal through an antenna. The electronic label may further include an EEPROM (Electrically Erasable Programmable Read Only Memory) module including an electrically erasable chip for storing the name, the origin, the price, the number information of a product, and so on.

The electronic label, also known as the Electronic Shelf Label (ESL), is an electronic display device capable of receiving and sending information. It is mainly used in supermarkets, convenience stores, pharmacies, and the like for displaying price information. The electronic label is an electronic display device which is placed on a shelf and can replace traditional paper price tags or labels. Each electronic shelf label is coupled to a computer database of a mall through a wired or wireless network, and the latest product information is displayed through the screen of the electronic shelf label. The electronic shelf label has in fact successfully incorporated the shelf into a computer program, freeing itself from the manual replacement of price tags, achieving price consistency between the checkout counter and the shelf. The electronic label has the following advantages: fast and accurate price display to improve customer satisfaction; more functions than paper labels (for example, the electronic labels can display promotional signs, multiple currency prices, unit price, inventory, and so on); reduced costs in production and maintenance of paper labels; lowered technical barriers to actively implement price strategies; unified online and offline product information.

It should be noted that the electronic label shown in FIG. 2 is only an example, and the disclosure is not limited thereto, and may include more or less constituting components.

Figure 3:
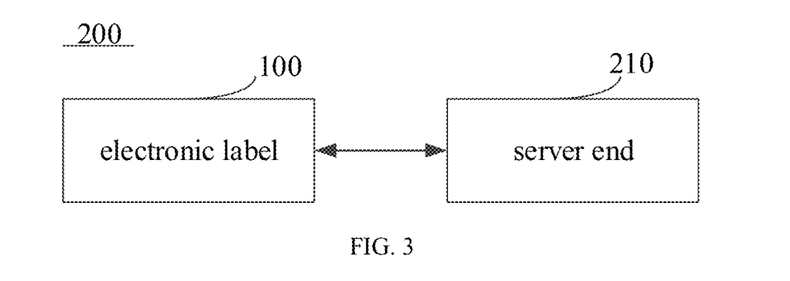
FIG. 3 shows a schematic diagram of an electronic label system according to an exemplary arrangement of the present disclosure.

FIG. 3 shows a schematic diagram of an electronic label system according to an exemplary arrangement of the present disclosure.

As shown in FIG. 3, the electronic label system 200 provided in this arrangement may include an electronic label 100 and a server end 210.

The electronic label 100 may include an electronic label body and a proximity sensing module. The proximity sensing module is configured to detect a human body within a certain range from the electronic label and generate a corresponding detection signal when a human body is detected. For the specific electronic label 100, detailed descriptions can be found in the arrangement described with reference to FIG. 1 and FIG. 2 above, and details are not described herein again.

The server end 210 can be configured to receive the detection signal, and obtain, according to the detection signal, a duration of stay of the human body before the electronic label.

In an exemplary arrangement, the electronic label system 200 further includes one or more image collection devices configured to collect video images within a predetermined range of the electronic label.

In the present arrangement, for example, the image collection devices are disposed on a ceiling of a supermarket, but the present disclosure is not limited thereto.

In an exemplary arrangement, the server end may be further configured to call one of the one or more image collection devices corresponding to the electronic label according to the detection signal, and acquire corresponding video images.

In an exemplary arrangement, the electronic label system 200 may further include a first image recognition device configured to recognize the video image to obtain the number of customers within a sensing range of the proximity sensing module (i.e., the first image recognition device recognizes the video image to how many customers are within a sensing range of the proximity sensing module).

In an exemplary arrangement, the server end 210 may be further configured to determine, according to the detection signal, whether there are a plurality of electronic labels that sense the human body at a same time period, and whether the plurality of electronic labels are adjacent to each other, and determine whether to call ones of the one or more image collection devices corresponding to the plurality of electronic labels according to a determination result.

In an exemplary arrangement, the electronic label system 200 may further include a second image recognition device configured to: if there are a plurality of electronic labels that sense the human body at the same time period and the plurality of electronic labels are adjacent to each other, pick up video images from the ones of the one or more image collection devices within the time period, recognize the video images within the time period, and determine a product to which attention is currently paid.

Specifically, when a customer enters a supermarket and approaches a certain shelf, the pyroelectric infrared human body sensor on the electronic label senses the presence of the human body, and the output signal of the pyroelectric infrared human body sensor becomes low. The MCU of the electronic label detects the low level, and internal programs in the MCU starts automatic timing. When the customer leaves, the pyroelectric infrared human body sensor outputs a high level signal, and the MCU of the electronic label detects the rising edge, and the timing ends. At this time, the electronic label reports information such as the starting time and the end time of the infrared sensing and ID of the electronic label to the server or the cloud end through the gateway.

After the server or the cloud end receives the above information, the information is classified, stored and analyzed. When there are a plurality of electronic label IDs in the same time period, whether the plurality of electronic labels corresponding to the electronic label IDs are adjacent to each other may be first determined according to the plurality of electronic label IDs. For example, whether the plurality of electronic labels are located in the same horizontal row of the same shelf, or whether the plurality of electronic labels are located in the two or more adjacent upper and lower rows of the same shelf, or whether the plurality of electronic labels are located on two or three adjacent shelves can be determined. When the plurality of electronic labels have an adjacent relationship, the server or the cloud end obtains the videos from the web camera on the ceiling in the middle of the shelves corresponding to the plurality of electronic labels and extracts video images in this time period, sends the images to the second image recognition device to recognize the video images in this time period and determine which product the user is currently paying attention to.

It should be noted that, in the foregoing arrangement whether multiple electronic labels have an adjacent relationship is determined. This is because the server receives multiple electronic label IDs in the same time period, and when the plurality of electronic labels corresponding to the multiple electronic label IDs have an adjacent relationship, the server cannot identify which one of the plurality of electronic labels the user is currently paying attention to according to the received plurality of electronic label IDs, and the obtained video image can be used to provide auxiliary analysis to determine the product corresponding to the electronic label which the user currently is paying attention to. If during the same time period, the server receives multiple electronic label IDs, and the plurality of electronic labels corresponding to the plurality of electronic label IDs do not have an adjacent relationship, for example, one of the plurality of electronic labels is located on the leftmost shelf of the supermarket, and the other electronic label is located on the rightmost shelf of the supermarket, the server can determine that different users have paid attention to different products during the same time period. Under such condition, the durations of stay of users before the plurality of electronic labels are directly counted separately.

The electronic label system of the arrangement of the present disclosure can record the time that a customer stays in front of a product through the function design of the electronic label, thus analyzing and recording the degree of attention of the product in the supermarket, and providing data support for the reasonable layout of the the supermarket.

Figure 4:
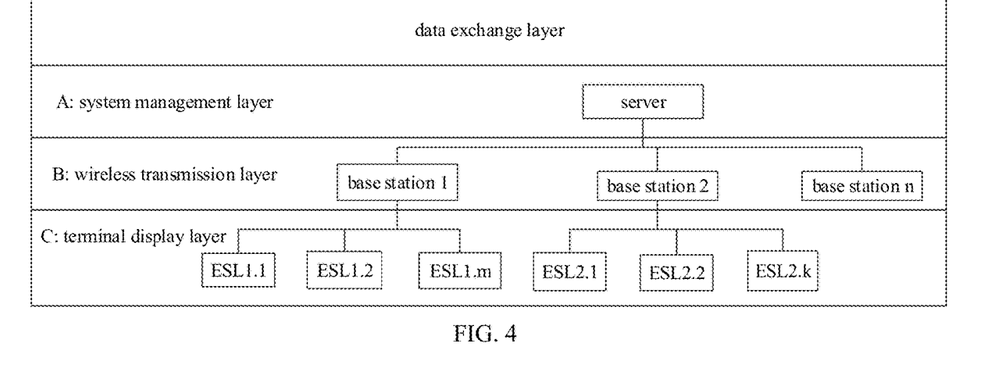
FIG. 4 shows a block diagram of an electronic label system according to an exemplary arrangement of the present disclosure.

FIG. 4 shows a block diagram of an electronic label system in an exemplary arrangement of the present disclosure.

As shown in FIG. 4, the data exchange layer includes: A: system management layer; B: wireless transmission layer; and C: terminal display layer.

The system management layer includes a server. The wireless transmission layer includes a base station 1, a base station 2, . . . , a base station n (n is a positive integer greater than or equal to 1). The terminal display layer may include ESL1.1, ESL1.2, and ESL1.m (m is a positive integer greater than or equal to 1) corresponding to the base station 1, and ESL2.1, ESL2.2, and ESL2.k (k is a positive integer greater than or equal to 1) corresponding to the base station 2.

A complete electronic label service system includes three parts: a server system, a wireless access point and the electronic label. First, product-related information is obtained from a customer database and then processed by electronic label application software installed in the server system, and the information such as the price to be updated is transmitted to the wireless access through the Ethernet (or serial communication port). The wireless access point transmits the radio frequency wireless signal carrying the commodity data information to a corresponding electronic label. The electronic label is a wireless data transceiver with an identification code, which can restore the received radio frequency signal to an effective digital signal and display the digital signal. The electronic label system has two communication functions: point-to-point communication and group communication, that is, the server system can transmit data to a specified electronic label, and can also control all electronic labels at one time.

Figure 5:
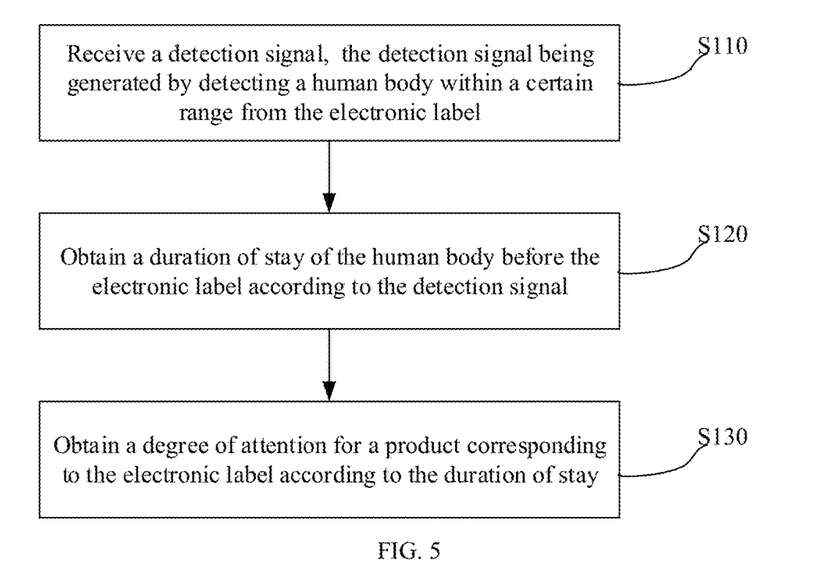
FIG. 5 shows a flow chart of a data processing method according to an exemplary arrangement of the present disclosure.

FIG. 5 shows a flow chart of a data processing method according to an exemplary arrangement of the present disclosure.

As shown in FIG. 5, the data processing method provided in this arrangement includes the following blocks.

In S110, a detection signal is received. The detection signal is generated when it is detected there is a human body within a certain range from the electronic label.

Descriptions regarding the electronic label may be found in the foregoing descriptions regarding the arrangements above with reference to FIGS. 1-4, and details are not described herein again.

In S120, a duration of stay of the human body before the electronic label is obtained according to the detection signal.

In S130, a degree of attention for a product corresponding to the electronic label is obtained according to the duration of stay.

In an exemplary arrangement, the method further includes: obtaining video images corresponding to the electronic label according to the detection signal.

In an exemplary arrangement, the method further includes recognizing the video images to obtain a number of customers within a certain range of the electronic label (i.e., the method further includes recognizing the video images to know how many customers are within a certain range of the electronic label).

In actual situations, when the server or the cloud end receives an electronic label ID, there may be multiple customers staying before the electronic label corresponding to the electronic label ID during the time period. At this time, camera corresponding to the electronic label may be called to obtain video images, and the number of the customers with a certain range from the electronic label (for example, the effective sensing range of the electronic label) may be identified according to the video images.

For example, when there are three customers that are close to each other standing near the same shelf, the same electronic label on the shelf senses the three customers at the same time. Under such condition, the electronic label sends the electronic label ID to the server or the cloud. If the three customers stay before the electronic label for the same duration, the duration of the stay may be multiplied by the number of customers (for example, 3) in the system. If the three customers stay before the electronic label for different durations, the duration of stay for each customer before the electronic label can be counted separately.

In this arrangement, the method may further include obtaining sales of the products, and classifying the products according to the sales of the products and the degree of attention to the products.

Specifically, a database is read by a supermarket checkout management system to obtain product sales and inventory in the same time period. Matching analysis is performed on data from the database and data regarding counted degree of attention of products, that is, synthesis analysis is performed on the degree of attention of the products and the sales of the products. For example, the products may be classified as follows: products with high degree of attention and good sales; products with high degree of attention and poor sales; products with low degree of attention and poor sales; and products with low degree of attention and good sales, and so on.

According to the comprehensive analysis and classification according to degree of attention and product sales, supermarkets or malls or stores and so on can reasonably adjust the layout of the products, thus increasing the sales of goods in the supermarkets or malls or stores.

The data processing method provided by the arrangement of the present disclosure can automatically record the residence time (in another word, duration of stay) of people in front of a product in a supermarket or mall, by adding a proximity sensing module such as a pyroelectric infrared human body sensor based on the previous electronic label, so that it is possible to analyze the degree of attention on products by using the residence time, and provide the supermarkets and company with the support of the big data regarding degree of attention on products, thus helping manufacturers to improve the products and optimize layout of the supermarket or mall.

Figure 6:
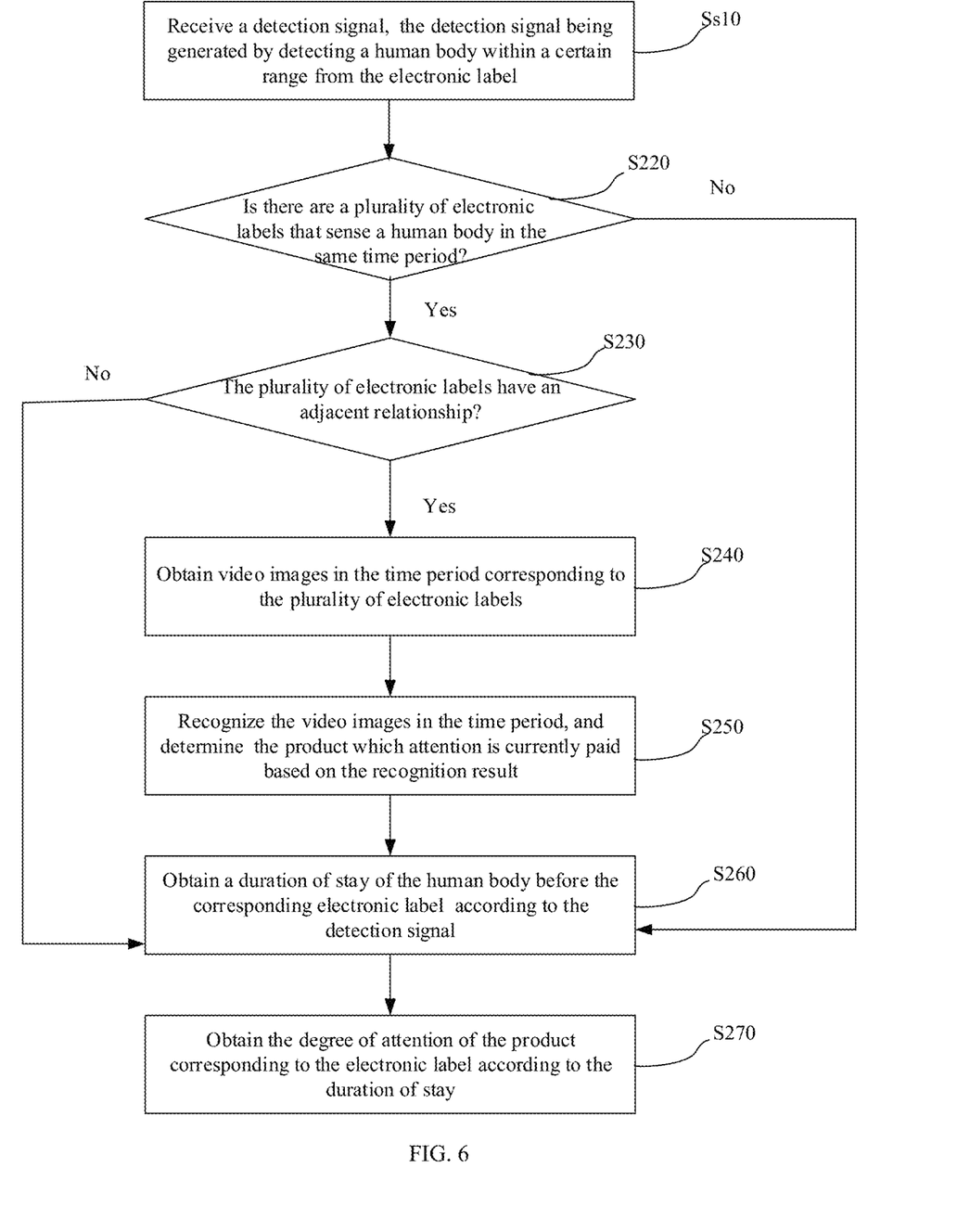
FIG. 6 shows a flow chart of another data processing method according to an exemplary arrangement of the present disclosure.

FIG. 6 shows a flow chart of another data processing method according to an exemplary arrangement of the present disclosure.

As shown in FIG. 6, the data processing method provided in this arrangement may include the following blocks.

In S210, a detection signal is received. The detection signal is generated by detecting a human body within a certain range from the electronic label.

In S220, whether a plurality of electronic labels sense a human body in the same time period is determined according to the detection signal. If the determination result is positive, the method proceeds to S230; otherwise, the method proceeds to S260.

In S230, whether the plurality of electronic labels have an adjacent relationship is determined; if the plurality of electronic labels have an adjacent relationship, the method proceeds to S240; otherwise, the method proceeds to S260.

In S240, video images in the time period corresponding to the plurality of electronic labels are obtained.

In S250, the video images in the time period are identified, and the product which attention is currently paid is determined based on the recognition result.

Specifically, when a customer enters a supermarket and approaches a certain shelf, the pyroelectric infrared human body sensor on the electronic label senses the presence of the human body, and the output signal of the pyroelectric infrared human body sensor becomes low. The MCU of the electronic label detects the low level, and internal programs in the MCU starts automatic timing. When the customer leaves, the pyroelectric infrared human body sensor outputs a high level signal, and the MCU of the electronic label detects the rising edge, and the timing ends. At this time, the electronic label reports information such as the starting time and the end time of the infrared sensing and ID of the electronic label to the server or the cloud end through the gateway.

In this arrangement, the method may further include determining, according to the starting time and the end time, whether the stay duration of the customer before the electronic label is greater than a preset threshold (the threshold may be set according to a specific situation, for example, 1 second). When the stay duration is greater than the preset threshold, it is determined that the customer stays before the electronic label; and when the stay duration is less than or equal to the preset threshold, it can be determined that the customer only passes the electronic label but does not stop and stay before the electronic label.

After the server or the cloud end receives the above information, the information is classified, stored and analyzed. When there are a plurality of electronic label IDs in the same time period, whether the plurality of electronic labels corresponding to the electronic label IDs are adjacent to each other may be first determined according to the plurality of electronic label IDs. For example, whether the plurality of electronic labels are located in the same horizontal row of the same shelf, or whether the plurality of electronic labels are located in the two or more adjacent upper and lower rows of the same shelf, or whether the plurality of electronic labels are located on two or three adjacent shelves can be determined. When the plurality of electronic labels have an adjacent relationship, the server or the cloud end obtains the videos from the web camera on the ceiling in the middle of the shelves corresponding to the plurality of electronic labels and extracts video images in this time period, sends the images to the second image recognition device to recognize the video images in this time period and determine which product the user is currently paying attention to.

In an exemplary arrangement, recognizing the video images within the time period and determining a product to which attention is currently paid includes extracting an action characteristic of the human body, and identifying the product to which attention is currently paid based on the action characteristic.

For example, when a customer touches or flips a corresponding product by hand, the image recognition module identifies the product that the customer specifically pays attention according to the action characteristic.

In an exemplary arrangement, recognizing the video images within the time period, and determining a product to which attention is currently paid includes identifying an angle between a human eye of the human body and a product in the video images, identifying an angle of depression or elevation of the human body in the video images, and determining whether the product is the product on which attention is currently paid based on the angle between the human eye and the product and the angle of depression or elevation of the human body.

In an exemplary arrangement, determining whether the product is the product on which attention is currently paid based on the angle between the human eye and the product and/or the angle of depression or elevation of the human body includes if the human eye and a product are parallel (in another word, the eye sight is parallel to a product) or the angle of depression or elevation and a deflection angle of the human body are within a first predetermined angle range, determining that the product on which attention is currently paid is a product on a shelf of a rack which is right in front the human body. If the head of the human body is elevated at an angle greater than a first predetermined angle, the step may include determining that the product on which attention is currently paid is a product on a first upper shelf of the rack. If the head of the human body is elevated at an angle greater than a second predetermined angle, the step may include determining that the product on which attention is currently paid is a product on a second upper shelf of the rack. If the head of the human body is bowed at an angle smaller than a third predetermined angle, the step may include determining that the product on which attention is currently paid is a product placed one shelf lower than the shelf right in front of the human body. If the head of the human body is bowed at an angle smaller than a fourth predetermined angle, the step may include determining that the product on which attention is currently paid is a product placed two shelves lower than the shelf right in front of the human body.

For example, when the customer does not touch a product by hand, the image recognition module makes a judgment based on the angle of the human eye and the product in the video and the angle of depression or elevation of the head of the human body. When the human eye is parallel to the product or the head is not elevated or bowed, it can be determined that the customer is paying attention on the product in front. When the head is elevated at an angle smaller than a certain angle, it can be determined that the product on which attention is currently paid is a product on a upper shelf of the rack. When the head is elevated at an angle greater than a certain angle, it can be determined that the product on which attention is currently paid is a product on a further upper shelf of the rack. When the head is bowed at an angle smaller than a certain angle, it can be determined that the product on which attention is currently paid is a product on a lower shelf of the rack. When the head is bowed at an angle greater than a certain angle, it can be determined that the product on which attention is currently paid is a product on a further lower shelf of the rack.

In an exemplary arrangement, recognizing the video images within the time period and determining a product to which attention is currently paid includes identifying a deflection angle of the human body in the video images, and determining a product to which attention is currently paid based on the deflection angle of the human body.

In an exemplary arrangement, determining a product to which attention is currently paid based on the deflection angle of the human body includes if the deflection angle to the left or the right is within a fifth predetermined angle range, determining that the product on which attention is currently paid is a product on a shelf of a rack which is right in front the human body. If the deflection angle to the left is greater than the fifth predetermined angle range, the step may include determining that the product on which attention is currently paid is a product on a first left column of the shelf. If the deflection angle to the left is greater than a sixth predetermined angle, the step may include determining that the product on which attention is currently paid is a product on a second left column of the shelf. If the deflection angle to the right is greater than a seventh predetermined angle, the step may include determining that the product on which attention is currently paid is a product on a first right column of the shelf. If the deflection angle to the left is greater than an eighth predetermined angle, the step may include determining that the product on which attention is currently paid is a product on a second right column of the shelf.

It should be noted that, in the above arrangements, the current product of interest is determined by the angle between the human eye and the product and/or the angle of depression or elevation of the human body, or the current product of interest is determined by the deflection angle of the human body. In other arrangements, it is also possible to comprehensively consider the angle between the human eye and the product and/or the angle of depression or elevation of the human body and the deflection angle of the human body to determine the current product of interest.

For example, when the human eye and the product are parallel or the head is not elevated or bowed or the human body has no deflection angle in the video images, it can be determined that the product in front is of interest. When the head is elevated at angle smaller than a certain angle and the head is deflected to the left front by a certain angle range, it can be determined that the product on the upper shelf in the left front is of interest; when the head is elevated at angle greater than a certain angle and the head is deflected to the left front by a certain angle range, it can be determined that the product on the further upper shelf in the left front is of interest; when the head elevated at angle smaller than a certain angle and the head is deflected to the right front by a certain angle range, it can be determined that the product on the upper shelf in the right front is of interest; and so on. Depending on different scenarios, different angle ranges may be set to determine the product which customers are currently paying attention to.

When there is only one electronic label ID data in the same time period, the data can be used as the customer's attention data for the product corresponding to the electronic label.

With continued reference to the arrangement shown in FIG. 6, the method may further include the following blocks.

In S260, a duration of stay of the human body before the corresponding electronic label is obtained according to the detection signal.

In S270, the degree of attention of the product corresponding to the electronic label is obtained according to the duration of stay.

Details of above S260 and S270 can be found in above descriptions regarding the arrangements shown in FIG. 5 and repeated descriptions are omitted.

The data processing method provided by the arrangement of the present disclosure can automatically record the residence time (in another word, duration of stay) of people in front of a product in a supermarket or mall, by adding a proximity sensing module such as a pyroelectric infrared human body sensor based on the previous electronic label, so that it is possible to analyze the degree of attention on products by using the residence time, and provide the supermarkets and company with the support of the big data regarding degree of attention on products, thus helping manufacturers to improve the products and optimize layout of the supermarket or mall. Also, in the method, by obtaining video images of corresponding electronic labels from corresponding camera and recognizing the video images, a plurality of electronic labels that sense the presence of a human body at the same period and have an adjacent relationship can be distinguished. In this way, the product which is of real interest may be determined. Thus, the accuracy in recording duration of stay can be improved.

The electronic label, electronic label system and data processing method in the above arrangement will be described below with reference to FIG. 7.

Figure 7:
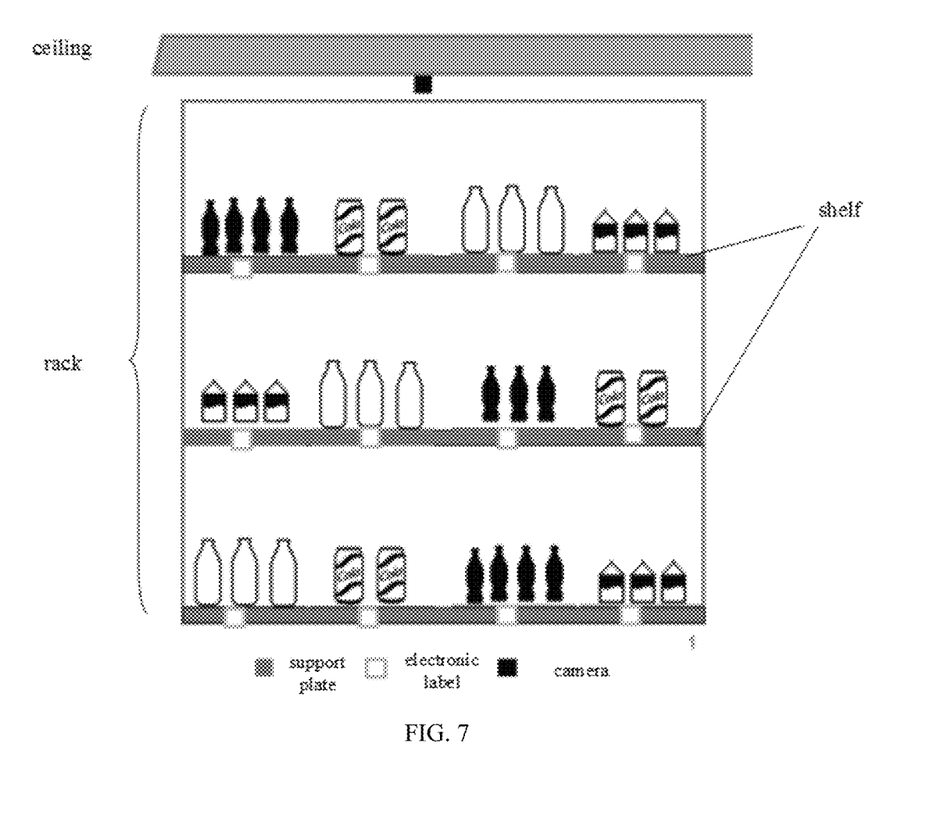
FIG. 7 shows an application schematic diagram of an electronic label according to an exemplary arrangement of the present disclosure.

FIG. 7 shows an application schematic diagram of an electronic label according to an exemplary arrangement of the present disclosure.

As shown in FIG. 7, a camera is disposed on the ceiling of a rack. In the figure, the camera can be disposed in the middle position above the rack, so that video images for a certain range from the rack below the camera can be captured.

The rack is usually used in a supermarket or a store. The rack is provided with shelves for displaying products on sale. Each of the shelves may be a plate or a solid layer which can support the products. In the example of FIG. 7, the rack includes a total of three layers (i.e., three shelves), and each layer includes four columns, which are, from left hand to the right hand in the figure, a first column, a second column, a third column, and a fourth column. Here, one column refers to a column of the same type of products, but does not refer to that a specific item constitutes a column. For example, the four black bottles at the top left corner of the uppermost layer form a column. Each floor has a support plate for placing products. An electronic label is disposed on the support plate of each column. In the figure, each electronic label is disposed at the middle position among a plurality of similar products in the same column. For example, in the case of four black bottles in the upper left corner of the top layer, the electronic label is disposed in the middle of the four black bottles.

It should be noted that in other arrangements, the electronic label can also be disposed in a special PVC (polyvinyl chloride) rail (the rail is fixed on the rack), or can be suspended, hooked or placed on the rack. The electronic label system also supports remote control, and the headquarters can manage the prices of chain divisions through a network. A plurality of pieces of information corresponding to the products are stored inside.

When a customer comes to the rack, for example, the customer is currently in front of the first column of products, at this time, the three electronic labels on the three layers of the first column can sense the proximity of the customer and can send the starting time and the end time of the proximity and the electronic label IDs to the server end separately. The server end first determines whether the customer has passed or stayed before the products in the first column according to whether the duration between the starting time and the end time exceeds a certain threshold. If the duration exceeds the threshold, the server end determines that the customer stays in front of the first column of products. During the same period of time, the server receives three electronic label IDs, and the three electronic labels have an adjacent relationship (the three electronic labels are disposed on three adjacent upper and lower layers), and the server end then accesses the camera above the rack to obtain video images in the time period. The video images are identified to determine what the customer is currently paying attention to. Specifically, although the customer is standing in front of the first column of products, the product of interest is not necessarily one or more of the products in the first column. For example, the customer can pay attention to the products on different layers of the second, third or even fourth column of the rack, by elevating his/her head, deflecting his/her head, bowing his/her head, turning his/her body and so on, and can even pay attention to the products on neighboring racks. Image recognition can be used to identify the product(s) which the customer is of interest.

When the customer walks from the first column to a position between the first column and the second column, the six electronic labels on the first column and the second column may simultaneously send the corresponding electronic label IDs to the server end. At this time, the server end accesses a corresponding camera, and determines which type of product the customer is currently paying attention to by using the image recognition technology.

There is also a case where, when a plurality of customers stand in front of a rack at the same time, the server end can access a corresponding camera to know how many customers currently stand in front of the rack by the image recognition technology. The server end can determine the current product of interest for each customer and the duration of stay of each customer before a product.

In this arrangement, each electronic label has a certain sensing range, and the area of the sensing range may be adapted to the area occupied by each column of products per layer. Also, the sensing distance of each electronic label can be set, that is, a human body within a certain distance from the rack can be sensed, and a human body exceeding the sensing distance cannot be sensed. A supermarket or store usually has a plurality of lines of racks, and the sensing distance can be set to be half of the distance between two adjacent racks, so that even a customer is between the two racks, the product which the customer is currently paying attention to can be identified. The sensing area and the sensing distance of an electronic label can be adjusted by adjusting the transmission power of the electronic label. Of course, the product which the customer is currently paying attention to can be determined by video images collected by a corresponding camera. For example, which rack the customer is facing can be determined according to the orientation of the face of the customer.

It should be noted that the rack(s), the number of layers and columns included in one of the rack(s), the placement of the products on the rack(s), the camera(s) on the rack(s), and the setting of the electronic labels are all exemplary, and can vary depending on layout of the supermarket or store.

Other arrangements of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and examples should be construed as exemplary, and the real scope and spirit are defined by the appended claims.

What is claimed is:

1. An electronic label, comprising:
   an electronic label body;
   a proximity sensing module that is disposed in the electronic label body and is configured to detect a human body within a certain range from the electronic label and generate a corresponding detection signal responsive to detecting the human body, wherein the detection signal is used to obtain a duration of stay of the human body before the electronic label; and
   a Microcontroller Unit (MCU), wherein
      in response to a presence of the human body being detected, the proximity sensing module outputs a signal of a first level, and the MCU starts timing; and
      in response to the human body being detected as outside of the certain range from the electronic label, the proximity sensing module outputs a signal of a second level, and the MCU stops the timing to obtain the detection signal.

2. The electronic label according to claim 1, wherein the proximity sensing module comprises a pyroelectric infrared sensing unit.

3. The electronic label according to claim 1, further comprising:
   a communication module configured to send the detection signal and corresponding unique identification of the electronic label.

4. The electronic label according to claim 1, wherein the proximity sensing module is disposed at an intermediate position of the electronic label body and has a preset sensing range.

5. An electronic label system, comprising:
   an electronic label that comprises an electronic label body, a proximity sensing module, and a Microcontroller Unit (MCU), wherein
      the proximity sensing module is configured to detect a human body within a certain range from the electronic label and generate a corresponding detection signal responsive to detecting the human body;
      in response to a presence of the human body being detected, the proximity sensing module outputs a signal of a first level, and the MCU starts timing; and
      in response to the human body being detected as outside of the certain range from the electronic label, the proximity sensing module outputs a signal of a second level, and the MCU stops the timing to obtain the detection signal; and
   a server end configured to receive the detection signal, and according to the detection signal, obtain a duration of stay of the human body before the electronic label.

6. The electronic label system according to claim 5, further comprising:
   one or more image collection devices configured to collect video images within a predetermined range of the electronic label.

7. The electronic label system according to claim 6, wherein the server end is further configured to call one of the one or more image collection devices corresponding to the electronic label according to the detection signal, and acquire the video images.

8. The electronic label system according to claim 7, further comprising:
   a first image recognition device configured to recognize the video image to obtain a number of customers within a sensing range of the proximity sensing module.

9. The electronic label system according to claim 6, wherein the server end is further configured to determine, according to the detection signal, whether a plurality of electronic labels that sense the human body of a customer at a same time period exist, and whether the plurality of electronic labels are adjacent to each other, and determine whether to call ones of the one or more image collection devices corresponding to the plurality of electronic labels according to a determination result.

10. The electronic label system according to claim 9, further comprising:
    a second image recognition device configured to: in response to determining that the plurality of electronic labels that sense the human body at the same time period exist and the plurality of electronic labels are adjacent to each other, pick up video images from the ones of the one or more image collection devices within the time period, recognize the video images within the time period, and determine a product to which attention of the customer is currently paid.

11. A data processing method, comprising:
receiving a detection signal, wherein the detection signal is generated by detecting a human body within a certain range from an electronic label;
obtaining a duration of stay of the human body before the electronic label according to the detection signal;
obtaining a degree of attention for a product corresponding to the electronic label according to the duration of stay;
in response to detecting a presence of the human body, generating a signal of a first level and starting timing; and
in response to detecting the human body as outside of the certain range from the electronic label, generating a signal of a second level and stopping the timing to obtain the detection signal.

12. The data processing method according to claim 11, further comprising:
obtaining video images corresponding to the electronic label according to the detection signal.

13. The data processing method according to claim 12, further comprising:
recognizing the video images to obtain a number of customers within a certain range of the electronic label.

14. The data processing method according to claim 12, further comprising:
determining, according to the detection signal, whether a plurality of electronic labels that sense the human body at a same time period exist and whether the plurality of electronic labels are adjacent to each other;
in response to determining that the plurality of electronic labels that sense the human body at the same time period exist and the plurality of electronic labels are adjacent to each other, obtaining video images corresponding to the plurality of electronic labels within the time period; and
recognizing the video images within the time period, and determining a first product to which attention is currently paid.

15. The data processing method according to claim 14, wherein recognizing the video images within the time period, and determining the first product to which attention is currently paid comprises:
extracting an action characteristic of the human body; and
identifying the first product to which attention is currently paid based on the action characteristic.

16. The data processing method according to claim 14, wherein recognizing the video images within the time period, and determining the first product to which attention is currently paid comprises:
identifying an angle between a human eye of the human body and a second product in the video images;
identifying an angle of depression or elevation of the human body in the video images; and
determining whether the second product in the video images is the first product on which attention is currently paid based on the angle between the human eye and the first product and the angle of depression or elevation of the human body.

17. The data processing method according to claim 16, wherein determining whether the second product in the video images is the first product on which attention is currently paid based on the angle between the human eye and the first product and/or the angle of depression or elevation of the human body comprises:

in response to determining that the human eye and the first product are parallel or the angle of depression or elevation and a deflection angle of the human body are within a first predetermined angle, determining that the first product on which attention is currently paid is placed on a shelf of a rack which is right in front of the human body;
in response to determining that the head of the human body is elevated at an angle greater than the first predetermined angle, determining that the first product on which attention is currently paid is placed one shelf higher than the shelf right in front of the human body;
in response to determining that the head of the human body is elevated at an angle greater than a second predetermined angle, determining that the first product on which attention is currently paid is placed two shelves higher than the shelf right in front of the human body;
in response to determining that the head of the human body is bowed at an angle smaller than a third predetermined angle, determining that the first product on which attention is currently paid is placed one shelf lower than the shelf right in front of the human body; and
in response to determining that the head of the human body is bowed at an angle smaller than a fourth predetermined angle, determining that the first product on which attention is currently paid is placed two shelves lower than the shelf right in front of the human body.

18. The data processing method according to claim 14, wherein recognizing the video images within the time period, and determining the first product to which attention is currently paid comprises:
identifying a deflection angle of the human body in the video images; and
determining the first product to which attention is currently paid based on the deflection angle of the human body.

19. The data processing method according to claim 18, wherein determining the first product to which attention is currently paid based on the deflection angle of the human body comprises:
in response to determining that the deflection angle to the left or the right is within a fifth predetermined angle, determining that the first product on which attention is currently paid is placed on a shelf of a rack which is right in front the human body;
in response to determining that the deflection angle to the left is greater than the fifth predetermined angle, determining that the first product on which attention is currently paid is a placed on a first left column of the shelf;
in response to determining that the deflection angle to the left is greater than a sixth predetermined angle, determining that the first product on which attention is currently paid is placed on a second left column of the shelf;
in response to determining that the deflection angle to the right is greater than a seventh predetermined angle, determining that the first product on which attention is currently paid is placed on a first right column of the shelf; and
in response to determining that the deflection angle to the left is greater than an eighth predetermined angle, determining that the first product on which attention is currently paid is placed on a second right column of the shelf.

20. The data processing method according to claim 11, further comprising:

obtaining sales of the product; and classifying the product according to the sales of the product and the degree of attention to the product.

* * * * *